(12) United States Patent
Hori (10) Patent No.: US 6,311,022 B2
(45) Date of Patent: Oct. 30, 2001

(54) FILM-BACK EXCHANGEABLE CAMERA

(75) Inventor: Masakatsu Hori, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/779,638

(22) Filed: Feb. 9, 2001

(30) Foreign Application Priority Data

Feb. 10, 2000 (JP) ................................. 12-0033735

(51) Int. Cl.$^7$ ........................... G03B 17/00; G03B 17/26
(52) U.S. Cl. ........................ 396/266; 396/296; 396/355; 396/373; 396/511
(58) Field of Search ..................... 396/266, 511, 396/535, 437, 263, 512, 355, 373, 414, 48, 502, 503, 448, 517–8, 360, 524, 296

(56) References Cited

U.S. PATENT DOCUMENTS

| | | | |
|---|---|---|---|
| 2,503,547 | * 4/1950 | Crowe | 396/524 |
| 4,349,266 | * 9/1982 | Maeda et al. | 396/544 |
| 4,636,055 | * 1/1987 | Alyfuku | 396/203 |
| 4,786,929 | * 11/1988 | Hamada et al. | 396/283 |
| 5,179,478 | 1/1993 | Aoki . | |
| 5,298,930 | * 3/1994 | Asakura et al. | 396/418 |
| 6,035,147 | 3/2000 | Kurosawa . | |

* cited by examiner

*Primary Examiner*—Russell Adams
*Assistant Examiner*—Kenneth J Whittington
(74) *Attorney, Agent, or Firm*—Greenblum & Bernstein, P.L.C.

(57) ABSTRACT

In a film back exchangeable camera provided with a camera body, an exchangeable film back is removably attached to the camera body. A light shielding member is removably attached to the film back so that the light shielding member prevents a film in the film back from being exposed when the light shielding member is attached to the film back, and so that the film is permitted to be exposed when the light shielding member is removed from the film back. The camera further includes film back attachment detecting means for detecting attachment of the film back to the camera body, light shielding member attachment detecting means for detecting attachment of the light shielding member to the film back, release lock means for switching a shutter between an operable state and an inoperable state; and viewfinder lock means for switching a viewfinder between an observable state and an unobservable state, so that the shutter being brought into the inoperable state by the release lock means and the viewfinder is brought into the unobservable state by the viewfinder lock means when attachment of the film back to the camera body is detected by the film back attachment detecting means and attachment of the light shielding member to the film back is detected by the light shielding member attachment detecting means.

27 Claims, 7 Drawing Sheets

FIG.8

FILM-BACK EXCHANGEABLE CAMERA

BACKGROUND OF THE INVENTION

The present invention relates to a camera in which an exchangeable film back is removably attached to a camera body, and particularly relates to a film back exchangeable camera having a light shielding function in a film back.

In a film back exchangeable camera in which a film back is removably attached to a camera body, light shielding means is used so as to prevent a film in the film back from being exposed when the film back is not attached to the camera body. The light shielding means is generally configured so that a photographer manually removes a light shielding member such as a light shielding plate or the like after attaching the film back to the camera body. Therefore, the photographer, who fails to remove the light shielding member, may carry out a photographic operation. Some film back exchangeable cameras in the background art are arranged so that a shutter is made inoperable by a release lock when a light shielding member is not removed. However, only by the release lock, the photographer cannot be informed of the fact that the photographer has failed the removal of the light shielding member unless the photographer carries out a shutter release operation actually. Thus, the photographer would often lose a shutter release opportunity.

SUMMARY OF THE INVENTION

Taking the foregoing problem into consideration, the present invention was developed. It is an object of the present invention to provide a film back exchangeable camera which reduces the possibility of a photographic mistake caused due to the failure of removing a light shielding member.

According to the present invention, there is provided a film back exchangeable camera comprising: a camera body; an exchangeable film back removably attached to the camera body; a light shielding member removably attached to the film back so that a film in the film back is prevented from being exposed when the light shielding member is attached to the film back, and so that the film is permitted to be exposed when the light shielding member is removed from the film back; film back attachment detecting means for detecting attachment of the film back to the camera body; light shielding member attachment detecting means for detecting attachment of the light shielding member to the film back; release lock means for switching a shutter between an operable state and an inoperable state; and viewfinder lock means for switching a viewfinder between an observable state and an unobservable state; wherein the shutter is brought into the inoperable state by the release lock means and the viewfinder is brought into the unobservable state by the viewfinder lock means when attachment of the film back to the camera body is detected by the film back attachment detecting means and attachment of the light shielding member to the film back is detected by the light shielding member attachment detecting means. According to this configuration, when a photographer has failed to remove the light shielding member, the photographer can sense and recognize a photographing impossible state when the photographer looks through the viewfinder prior to a shutter release operation. Thus, the possibility of a photographic mistake such as losing a shutter release opportunity is reduced.

According to the present invention, in the film back exchangeable camera, there is further provided photo-metering means for carrying out photo-metering in response to turning-on of a photo-metering switch in addition to the release lock means, the shutter is brought into the inoperable state by the release lock means and the photo-metering means is prevented from carrying out photo-metering even if the photo-metering switch is turned on, when attachment of the film back to the camera body is detected by the film back attachment detecting means and attachment of the light shielding member to the film back is detected by the light shielding member attachment detecting means. Thus, if an operation to be executed practically in response to the turning-on of the photo-metering switch is not executed, there increases a possibility for the photographer to notice that the photographer has failed to remove the light shielding member prior to the shutter release operation. It is therefore possible to reduce a photographic mistake.

According to the present invention, in the film back exchangeable camera, there is still further provided external display means provided in an outer surface of the camera body in addition to the release lock means, the shutter is brought into the inoperable state by the release lock means and an indication of the photographing impossible state is displayed by the external display means, when attachment of the film back to the camera body is detected by the film back attachment detecting means and attachment of the light shielding member to the film back is detected by the light shielding member attachment detecting means. Also by such a warning based on external display, the photographer can recognize the fact that the photographer has failed to remove the light shielding member at a time earlier than the case where only a release lock is used.

That is, when the light shielding member is not removed though the film back is attached to the camera body, the photographer can recognize the photographing impossible state prior to a shutter release operation by three new measures: making the viewfinder unobservable; rejecting an input from the photo-metering switch; and displaying a photographing impossible mark on an external portion; in addition to the release lock. These three measures can be combined desirably. That is, only one of them may be carried out, or two or three of them may be carried out in combination.

In the case where the viewfinder is made unobservable by the viewfinder lock means, preferably, the viewfinder lock means has a mirror in the camera body, the mirror being able to move between an observation position where the mirror is located on a photographic optical path so as to guide luminous flux passing through a camera lens to an optical system of the viewfinder, and a photographing position where the mirror escapes from the photographic optical path so as to allow the luminous flux to reach the film back, and the mirror is moved to the photographing position when the film back is attached to the camera body and the light shielding member is attached to the film back. Further, in the above film back exchangeable camera, the viewfinder lock means may have a movable eyepiece shutter which is able to be opened/closed in an optical system of the viewfinder, the eyepiece shutter being closed when the film back is attached to the camera body and the light shielding member is attached to the film back. Further, in the above film back exchangeable camera, the viewfinder lock means may have a light-transmission adjusting medium in an optical system of the viewfinder, the light-transmission adjusting medium being able to change between a transparent state and a light scattering state to scatter incident light, and at least a part of a view-field area of the viewfinder is brought into the light scattering state by the light-transmission adjusting medium when the film back is attached to the camera body and the light shielding member is attached to the film back. The light-transmission adjusting medium may be, for example, a light-transmissible liquid crystal.

In the case where the camera has a photo-metering switch, the camera further comprises automatic focusing means for carrying out a focusing operation in response to turning-on of the photo-metering switch, and the automatic focusing means can be prevented from carrying out the focusing operation even if the photo-metering switch is turned on when the film back is attached to the camera body and the light shielding member is attached to the film back. Preferably, the camera further has an in-viewfinder display which is lit in response to turning-on of the photo-metering switch, so that the in-viewfinder display is prevented from being lit even if the photo-metering switch is turned on when the film back is attached to the camera body and the light shielding member is attached to the film back.

The present disclosure relates to the subject matter contained in Japanese patent application No. 2000-33735 (filed on Feb. 10, 2000), which is expressly incorporated herein by reference in its entirety.

DESCRIPTION OF THE PREFERRED EMBODIMENT

Figure 1:
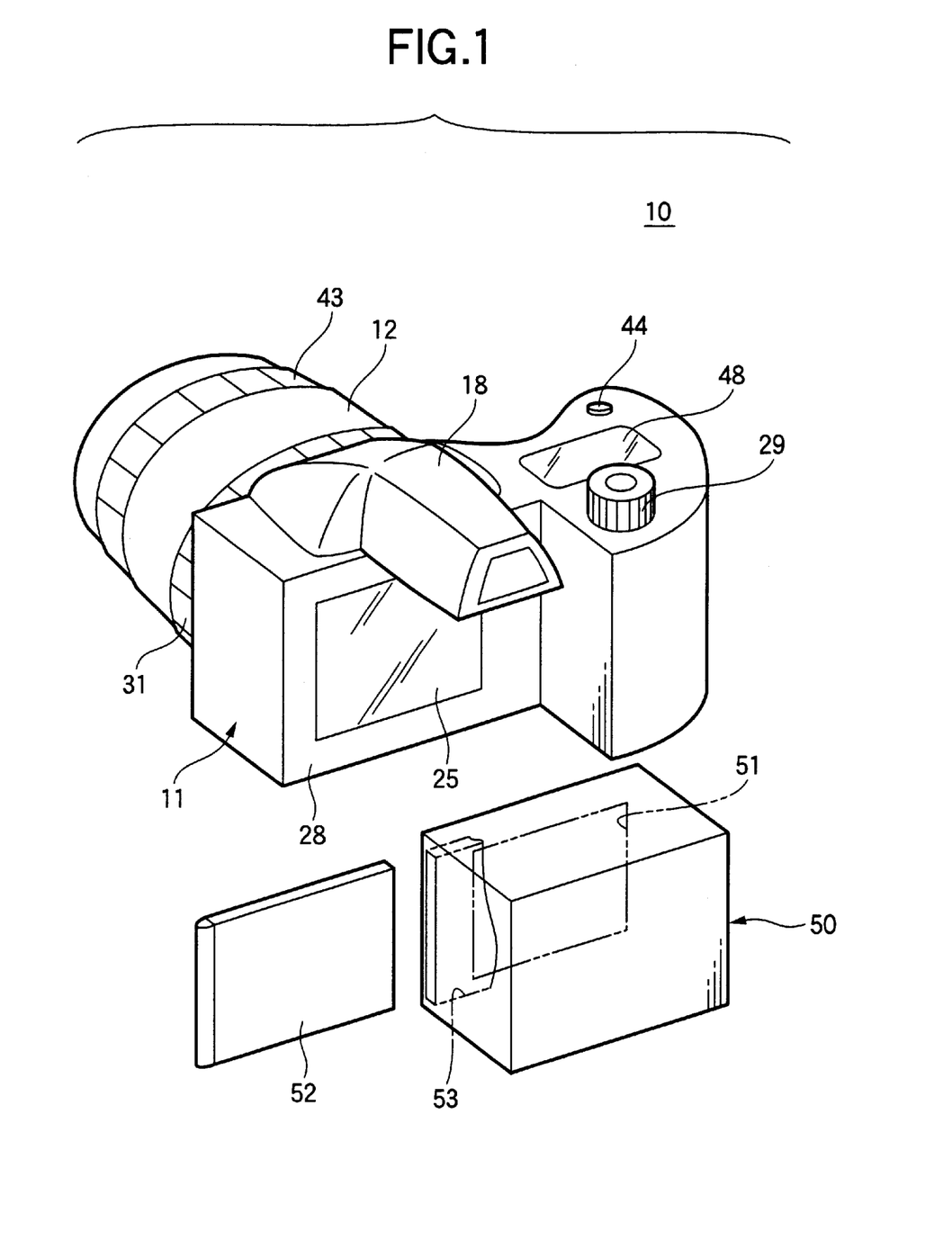
FIG. 1 is a perspective view showing the external appearance of a film back exchangeable camera according to an embodiment of the present invention.
Figure 2:
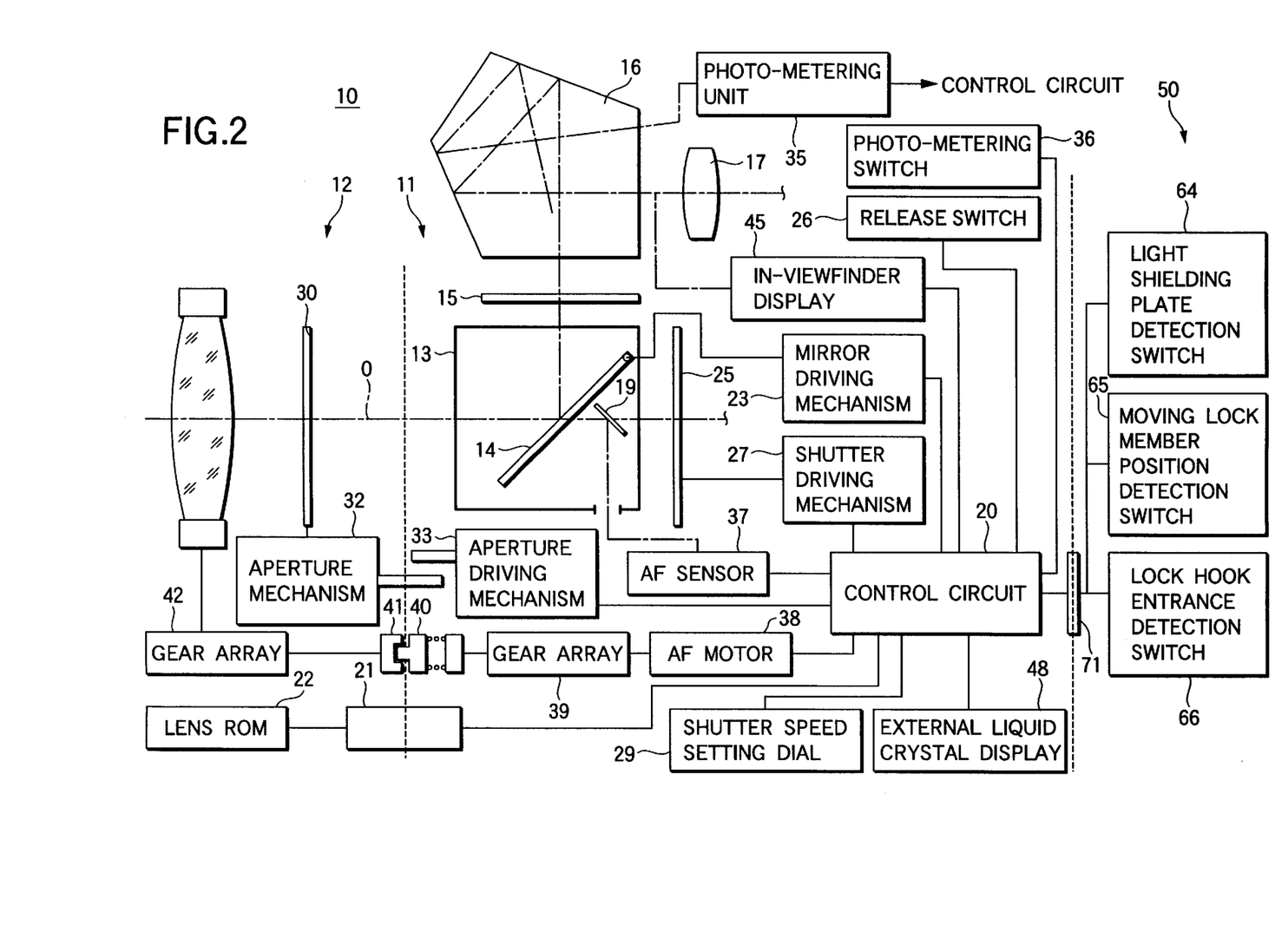
FIG. 2 is a schematic view showing an optical system and a circuitry of the film back exchangeable camera in FIG. 1.

FIG. 1 shows the external appearance of a film back exchangeable camera 10 of a single-lens reflex type in which a film back 50 prepared separately is removably attached to a camera body 11. FIG. 2 schematically shows an optical system and a circuitry of the film back exchangeable camera 10. A control circuit 20 for controlling the film back exchangeable camera 10 as a whole is provided in the camera body 11.

A camera lens 12 is provided in a front portion of the camera body 11. Although the camera lens 12 in this embodiment is an exchangeable lens-barrel which is removably attached to the camera body 11, the lens may be an unexchangeable one. When the camera lens 12 is mounted on the camera body 11 so that connectors 21 respectively provided in the camera body 11 and the camera lens 12 come into contact with each other, information stored in a lens ROM 22 is supplied to the control circuit 20. The information stored in the lens ROM 22 is, for example, the full-aperture F-number of the camera lens 12, or the like. The control circuit 20 uses this information for exposure control.

As shown in FIG. 2, in a mirror box 13 at the rear of the camera lens 12, a main mirror 14 is rotatably provided between a lower position on a photographic optical path and an upper position escaping from the photographic optical path. The main mirror 14 is rotated by a mirror driving mechanism 23 controlled by the control circuit 20.

When the main mirror 14 is located on the photographic optical path as shown in FIG. 2, most of luminous flux entering the mirror box 13 along the photographic optical axis O of the camera lens is reflected upward by the main mirror 14 and focused on a focusing screen 15 so as to be observed as a correct image through a pentaprism 16 and an eyepiece 17. The pentaprism 16 and the eyepiece 17 are supported in a viewfinder block 18 at the upper portion of the camera body 11. Incidentally, the configuration of the correct-image optical system of the viewfinder is not limited to the configuration of FIG. 2 using the pentaprism.

When the main mirror 14 is rotated to the upper position out of the photographic optical path, the photographic luminous flux of the camera lens 12 reaches a focal plane shutter 25 provided at the rear of the main mirror 14. The focal plane shutter 25 is provided with a front curtain and a rear curtain. In response to the turning-on of a release switch 26, the front curtain and the rear curtain are made to run with a predetermined time difference by a shutter driving mechanism 27. As shown in FIG. 1, the focal plane shutter 25 faces a film back attachment surface 28 in the rear of the camera body 11 so that the quantity of light transmitted toward a film back 50 changes in accordance with the running time difference between the front and rear curtains, that is, in accordance with the shutter speed. A shutter speed setting dial 29 is provided on the top of the camera body 11 so that the shutter speed can be set manually. In addition, when the shutter speed setting dial 29 is set at an auto position, the shutter speed is set automatically. Incidentally, as soon as the release switch 26 is turned on, the main mirror 14 is rotated to the aforementioned upper position by the mirror driving mechanism 23.

Aperture blades 30 are provided in the camera lens 12. The aperture blades 30 are opened/closed through an aperture mechanism 32 by the rotary operation of an aperture operating ring 31. In addition, automatic setting of an F-number can be selected by holding the aperture operating ring 31 in an auto position. The camera body 11 has an aperture driving mechanism 33 including a driving source for driving the aperture blades 30. The aperture driving mechanism 33 is connected to the aperture mechanism 32 so that the aperture blades 30 are driven by the aperture driving mechanism 33 to open or c lose.

A photo-metering unit 35 is disposed near the pentaprism 16 in the viewfinder block 18. The control circuit 20 carries out photo-metering with the photo-metering unit 35 in response to an input from the photo-metering switch 36. As described above, in the film back exchangeable camera 10 according to this embodiment, the F-number and the shutter speed can be set manually or automatically respectively. That is, exposure control can be selected from four kinds of modes: a mode to set both the F-number and the shutter speed automatically, modes to set one of the F-number and the shutter speed manually while setting the other automatically, and a mode to set the both manually. Photometric data obtained by the photo-metering unit 35 is utilized in any one of the exposure control modes. For example, in an automatic exposure mode in which one or both of the F-number and the shutter speed are set automatically, the control circuit 20 sets the F-number and the shutter speed on the basis of a photometric value. Even when both the F-number and the shutter speed are set manually, photo-metering is carried out, and the combination of the F-number and the shutter speed selected by a photographer is compared with the photometric value.

The film back exchangeable camera 10 in this embodiment also has an automatic focusing function. When the main mirror 14 is located on the optical path, a part of luminous flux passing through the camera lens 12 is transmitted through the main mirror 14 and reflected downward by a sub-mirror 19 so as to make the reflected luminous flux go out from the mirror box 13. An AF sensor 37 is disposed under the mirror box 13 so as to detect the defocus amount of a subject for photography. An AF motor 38 is provided in the camera body 11 so as to drive a convex AF coupler 40 to rotate through a gear array 39. On the other hand, the camera lens 12 is provided with a concave AF coupler 41 which engages with the AF coupler 40 when the camera lens 12 is attached to the camera body 11. When the AF motor 38 is driven in the condition that the AF couplers 40 and 41 engage with each other, the AF coupler 41 is rotated through the AF coupler 40. Further, because a gear array 42 is connected to the AF coupler 41, the gear array 42 is driven to rotate by the AF motor 38 when the AF motor 38 is driven, so that a group of focus lenses constituting the camera lens 12 are moved forward/backward along a photographic optical axis O. In such a manner, the focal position can be changed. That is, a focusing operation can be achieved if the AF motor 38 is driven suitably. If the photo-metering switch 36 is turned on, the control circuit 20 carries out an operation for obtaining the driving amount of the AF motor 38 required for reducing the defocus amount to zero on the basis of defocus data supplied from the AF sensor 37. Then, the control circuit 20 drives and controls the AF motor 38 on the basis of the obtained driving amount. Thus, the focus lenses are moved to achieve a focusing operation.

Alternatively, focusing may be performed by a manual operation. If the focus operating ring 43 provided in the camera lens 12 is rotated, the group of focus lens are moved along the optical axis O. In this case, the photographer confirms the focusing condition on the basis of the image of the subject observed through the viewfinder.

A release button 44 is provided in the upper surface of the camera body 11. The release button 44 is formed as a two-stage push button so that the photo-metering switch 36 is turned on by half-way depression of the release button 44 while the release switch 26 is turned on by the full depression of the release button 44.

Figure 4:
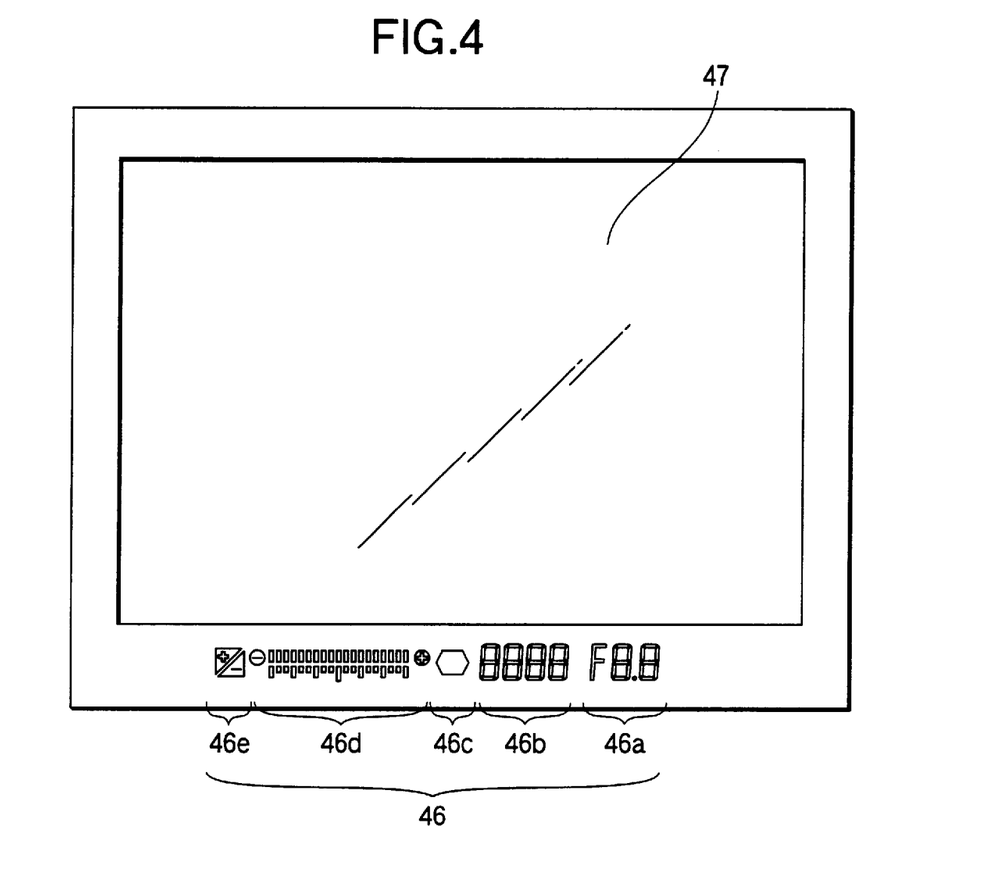
FIG. 4 is a view showing an observed state through a viewfinder of the camera in FIGS. 1 and 2.

An in-viewfinder display 45 is provided in the viewfinder block 18. The in-viewfinder display 45 is constituted by illuminants such as LEDs disposed outside the optical path of the optical system of the viewfinder, reflective members for guiding light emitted from the illuminants into the optical path, and so on. As shown in FIG. 4, in the viewfinder block 18, pieces of information are displayed on a data display portion 46 located under a subject image observation area 47 by the in-viewfinder display 45. In detail, the data display portion 46 is constituted by an F-number display portion 46a, a shutter speed display portion 46b, a focusing mark 46c, a bar graph 46d, and an exposure compensation mark 46e.

When the photo-metering switch 36 is turned on, the F-number and the shutter speed set automatically or manually are displayed on the F-number display portion 46a and the shutter speed display portion 46b. When both the F-number and the shutter speed are set manually, a comparison with a set exposure value is further displayed on the bar graph 46d with reference to the photometric value obtained by the photo-metering unit 35. The focusing mark 46c is lit when focusing is finished after auto-focus selection. Even in manual focus, control is performed in response to the turning-on of the photo-metering switch 36, so that the focusing mark 46c is lit when the defocus amount is detected being zero. In addition, when a not-shown operating member for exposure compensation is operated, the exposure compensation mark 46e is lit while an exposure compensation value is displayed on the bar graph 46d.

Figure 5:
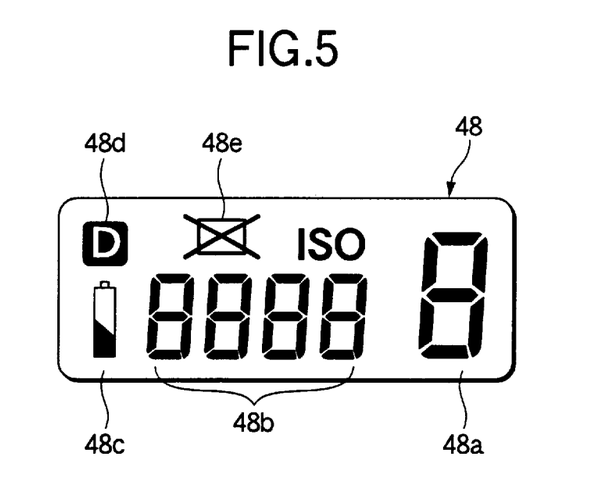
FIG. 5 is a view showing an example of indication of an external liquid crystal display.

An external liquid crystal display (external display means) 48 is provided on the top of the camera body 11. The external liquid crystal display 48 can display the film sensitivity, the number of taken frames, the remaining amount of a battery, and so on, under the control of the control circuit 20. FIG. 5 shows the external liquid crystal display 48 having all its display elements displayed. As shown in FIG. 5, the external liquid crystal display 48 is constituted by a film counter 48a, a film sensitivity display portion 48b, a battery remaining amount display portion 48c, a photographic data recording mode display portion 48d, and a photographing impossible mark 48e. The external liquid crystal display 48 is lit in response to the turning-on of a not-shown main switch provided in the camera body 11. Incidentally, the camera 10 according to the embodiment can record photographic data outside a photographic picture area of a film. When a data recording mode is selected, the photographic data recording mode display portion 48d is lit.

The film back 50 can be removably attached to a rear portion of the camera body 11 configured as described above. In the film back 50, a substantially rectangular aperture 51 is formed to face the focal plane shutter 25. In the film back 50, a film feed mechanism (not shown) is provided for moving a film (not shown) behind the aperture 51. In one side of the film back 50, a slit 53 for removably inserting a light shielding plate (light shielding member) 52 is formed in front of the running plane of the film. When the light shielding plate 52 is inserted into the slit 53, luminous flux to enter inward through the aperture 51 is blocked so that the film is prevented from being exposed. Incidentally, the slit 53 is configured so as not to allow light to leak from the slit 53 into the film back 50.

Figure 3:
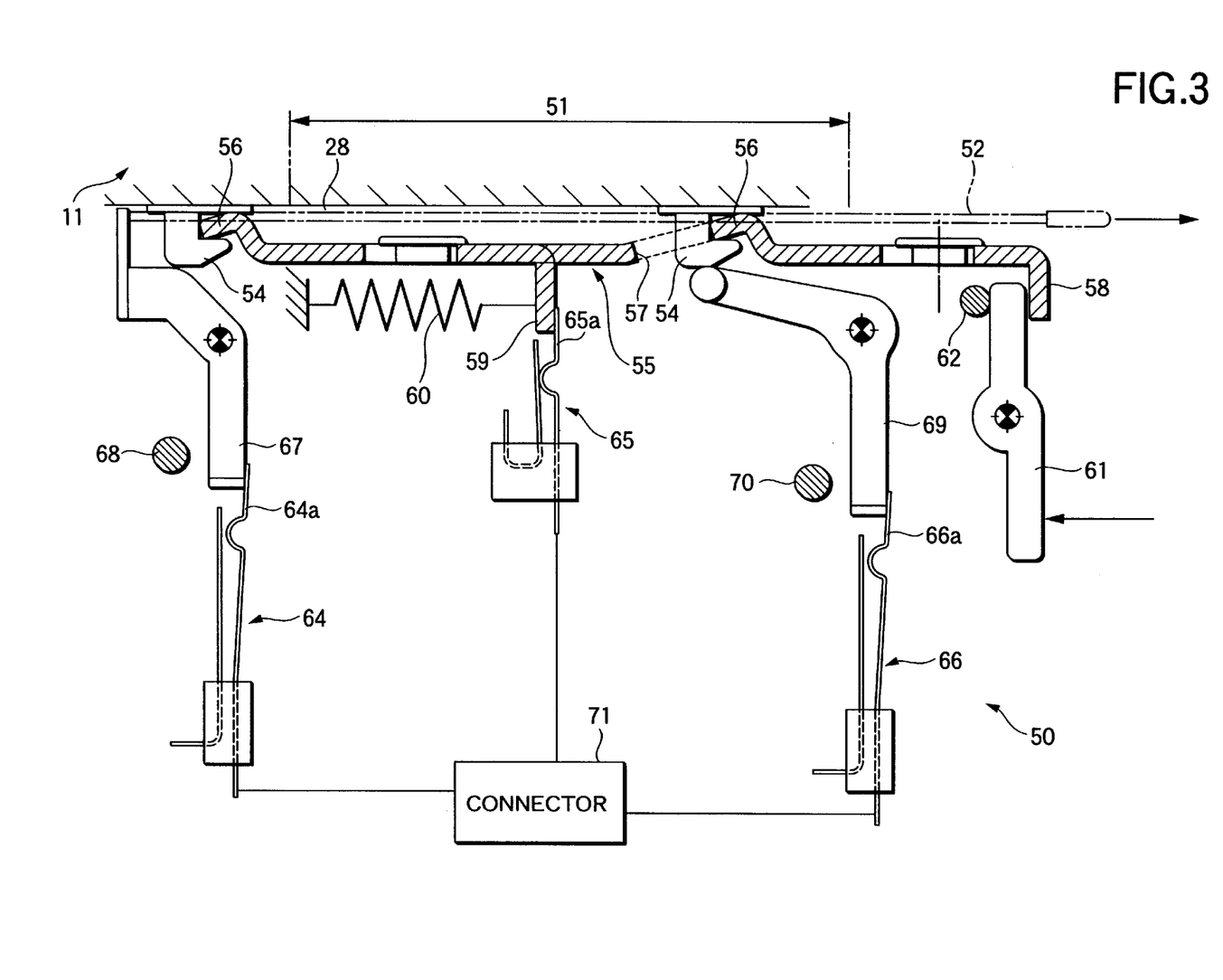
FIG. 3 is a view showing a lock mechanism and a detection switch mechanism of a film back, which are provided at a boundary portion between a camera main body and a film back.

FIG. 3 shows a lock mechanism for fixedly attaching the film back 50 to the camera body 11. Incidentally, FIG. 3 shows the condition of the film back exchangeable camera 10 viewed from its bottom so that right and left in FIGS. 1 and 3 are reversed to each other. That is, the light shielding plate 52 is inserted into the slit 53 toward the right in FIG. 1 while it is inserted toward the left in FIG. 3.

A pair of lock hooks 54 are provided on the film back attachment surface 28 of the camera body 11. The lock hooks 54 are not shown in FIG. 1. Each of the lock hooks 54 is formed into an L-like shape extending outward at the rear of the camera body 11 and bent therefrom toward a side of the camera. On the other hand, a moving lock member 55 provided with a pair of protrusion engagement portions 56 which can engage with the lock hooks 54 respectively is provided in the film back 50. The pair of protrusion engagement portions 56 are formed to be different in longitudinal position on the moving lock member 55. That is, one of the pair of protrusion engagement portions 56 is formed in one of end portions of the moving lock member 55 while the other is formed in an intermediate portion thereof. In the intermediate protrusion engagement portion 56, a hook insertion/detachment hole 57 is formed so that the lock hook 54 can be inserted therethrough. An operated arm 58 bent toward the back of the camera is provided in the end portion opposite to the protrusion engagement portion 56 in the longitudinal direction of the moving lock member 55. In addition, a switch operating arm 59 is provided substantially at the longitudinal center of the moving lock member 55.

The moving lock member 55 is supported movably substantially in parallel (in the left/right direction of FIG. 3) with the insertion/detachment direction of the light shielding plate 52. The moving lock member 55 is urged to move toward a lock position (left in FIG. 3) to engage with the lock hook 54 by a lock member urging spring 60. An unlock operating portion 61 for moving the moving lock member 55 to an unlock position (right in FIG. 3) against the urging force of the lock member urging spring 60 is pivotally supported in the film back 50. One of end portions of the unlock operating portion 61 is in contact with the operated arm 58 of the moving lock member 55, and is held in contact with a stopper 62 in a rotary position through the moving lock member 55 urged to move in the lock direction if no external force is applied to the unlocked operating portion 61, that is, if the unlock operating portion 61 is not operated. When the unlock operating portion 61 is rotated clockwise in FIG. 3 against the urging force of the lock member urging spring 60, the operated arm 58 can be pressed to move the moving lock member 55 to the unlock position. The unlock operating portion 61 can be operated from the outside of the film back 50.

In the front surface of the film back 50, a pair of holes (not shown) are provided for making the pair of lock hooks 54 advance up to the engagement positions to engage with the moving lock members 55. When the film back 50 is attached to the camera body 11, the film back 50 is brought close to the film back attachment surface 28 while the positions of the pair of holes are made to correspond to the positions of the lock hooks 54. At this time, the moving lock member 55 is held in the lock position by the urging force of the lock member urging spring 60. Therefore, when the pair of lock hooks 54 of the camera body 11 enter the film back 50, the lock hooks 54 come in contact with the pair of the protrusion engagement portions 56. An inclined shape is established in each of the contact portions between the lock hooks 54 and the protrusion engagement portions 56 so that a component of a force to move the moving lock member 55 in the unlock direction is generated while the film back 50 is moved in the attached direction. As a result, if the film back 50 is continued to move in the attachment direction, the moving lock member 55 is moved in the unlock direction so that the pair of lock hooks 54 get over the corresponding protrusion engagement portions 56 respectively. Then, one of the lock hooks 54 enters the hook insertion/detachment hole 57. When the inclined contact portions of the respective lock hooks 54 get over the protrusion engagement portions 56 completely, the moving lock member 55 which has been pressed in the unlock direction returns to the lock position by the operation of the lock member urging spring 60. Thus, the pair of lock hooks 54 are brought into engagement with the pair of protrusion engagement portions 56 as shown in FIG. 3. By these engagements, the film back 50 is locked in the condition that the film back 50 is in close contact with the film back attachment surface 28.

When the film back 50 is detached from the camera body 11, the unlock operating portion 61 is rotated clockwise as described above. Then, the moving lock member 55 moves to the unlock position so that the engagements of the lock hooks 54 with the protrusion engagement portions 56 are released. By releasing the engagements, the film back 50 is allowed to move in the direction reverse to the direction in which the film back 50 is moved for attachment. Thus, the film back 50 can be detached from the camera body 11.

A light shielding plate detection switch (light shielding member attachment detecting means) 64, a moving lock member position detection switch (film back attachment detecting means) 65 and a lock hook entrance detection switch (film back attachment detection means) 66 are provided in the film back 50. Each switch 64 (65, 66) is constituted by a pair of switch contact pieces. At least one of the pair of switch contact pieces is an elastically deformable switch contact piece 64a (6a, 66a).

A light shielding plate interlocking lever 67 is pivotally supported in the camera body 11. One end portion of the light shielding plate interlocking lever 67 abuts against the elastic switch contact piece 64a of the light shielding plate detection switch 64 while the other end portion is extended to the vicinity of the deepest portion of the slit 53. When no external force is applied to the light shielding plate interlocking lever 67, the light shielding plate interlocking lever 67 is held, by the elastic switch contact piece 64a, in the rotation position where the light shielding plate interlocking lever 67 is in contact with a stopper 68. Accordingly, the light shielding plate detection switch 64 is turned on. When the light shielding plate 52 is inserted into the slit 53, the forward end portion of the light shielding plate 52 presses the light shielding plate interlocking lever 67. Thus, the light shielding plate interlocking lever 67 is rotated counterclockwise in FIG. 3. By the rotation of the light shielding plate interlocking lever 67, the elastic switch contact piece 64a is pressed so that the light shielding plate detection switch 64 is turned off.

The moving lock member position detection switch 65 is turned on when the moving lock member 55 is located in the lock position. When the moving lock member 55 moves from the lock position to the unlock position, the switch operation arm 59 pushes the elastic switch contact piece 65a. Thus, the elastic switch contact piece 65a is elastically deformed to turn the moving lock member position detection switch 65 off. If the moving lock member 55 returns to the lock position, the moving lock member position detection switch 65 restores to the turned-on state.

One end portion of a relay lever 69 abuts against the elastic switch contact piece 66a of the lock hook entrance detection switch 66. The relay lever 69 is formed into an L-shape and pivotally attached at the bent portion of the L-shape in the film back 50. In the condition that no external force is applied to the relay lever 69, the relay lever 69 is held, by the elastic switch contact piece 66a, in the rotation position where the relay lever 69 abuts against a stopper 70. Thus, the lock hook entrance detection switch 66 is turned on. When the film back 50 is attached to the camera body 11, one end portion of the relay lever 69 is pressed by one of the lock hooks 54 inserted up to the engagement positions where the lock hooks 54 engage with the moving lock member 55. As a result, the relay lever 69 is rotated counterclockwise in FIG. 3. By the rotation of the relay lever 69, the elastic switch contact piece 66a is pressed so that the lock hook entrance detection switch 66 is turned off.

When the film back 50 is attached to the camera body 11, the respective switches 64 to 66 are connected to the control circuit 20 in the camera body 11 through a connector 71. The control circuit 20 controls the camera in accordance with the detection conditions of the switches 64 to 66 as follows.

When the light shielding plate 52 is inserted into the slit 53 before the film back 50 is attached to the camera body 11, the pair of switch contact pieces of the light shielding plate detection switch 64 are separated from each other. On the other hand, the pair of switch contact pieces of the moving lock member position detection switch 65 are in contact with each other because the moving lock member 55 is located in the lock position. Further, the pair of switch contact pieces of the lock hook entrance detection switch 66 are in contact with each other because the lock hooks 54 are not inserted into the film back 50.

When the film back 50 is attached to the camera body 11, the pair of lock hooks 54 are inserted into the film back 50 so as to engage with the protrusion engagement portions 56 of the moving lock member 55. At this time, one of the lock hooks 54 presses the relay lever 69 so as to turn the lock hook entrance detection switch 66 off. On the other hand, the moving lock member 55 is moved toward the unlock position once with the insertion of the lock hooks 54, and then returns to the lock position. Therefore, the moving lock member position detection switch 65 is in a turned-on state. That is, the attachment of the film back 50 to the camera body 11 is detected when the moving lock member position detection switch 65 is turned on and the lock hook entrance detection switch 66 is turned off.

Here, when the light shielding plate 52 is drawn out of the slit 53, the light shielding plate detection switch 64 is turned on. If the control circuit 20 detects the combination of the turned on/off states of the respective switches at this time, that is, if the control circuit 20 detects the conditions that the light shielding plate detection switch 64 and the moving lock member position detection switch 65 are turned on respectively while the lock hook entrance detection switch 66 is turned off, the control circuit 20 concludes that it is possible to take a photograph. In other words, it is made possible to take a photograph when it is detected that the film back 50 has been attached to the camera body 11 and the light shielding plate 52 has been removed from the film back 50.

If the release button 44 is half-way depressed in such a condition that it is possible to take a photograph, the photo-metering switch 36 is turned on. Thus, photo-metering is carried out to control the exposure. That is, when at least one of the F-number and the shutter speed is set automatically, the control circuit 20 determines the F-number or the shutter speed on the basis of a photometric value obtained by the photo-metering, and the photometric value determined thus is displayed in the viewfinder by the in-viewfinder display 45. Any value set manually is also displayed in the viewfinder in response to the turning-on of the photo-metering switch 36. Further, when both the F-number and the shutter speed are set manually, the comparison of a set exposure value with the photometric value is displayed as described above. When the auto-focus mode is selected, a focusing operation is carried out with the turning on of the photo-metering switch 36, and the focusing mark 46c is lit when focusing is finished.

Further, when the release button 44 is depressed fully, the release switch 26 is turned on so that the main mirror 14 escapes upward from the photographic optical path. The sub-mirror 19 escapes from the photographic optical path while coming parallel with the main mirror 14. After the mirrors have moved up, the focal plane shutter 25 is actuated at a set shutter speed so that the film is exposed. Further, the aperture driving mechanism 33 is driven in response to the turning-on of the release switch 26 so that the aperture blades 30 are closed/opened to the set F-number.

After the film is exposed, the main mirror 14 moves back to the lower position on the photographic optical path. In addition, the film is wound up by a not-shown film winding mechanism.

On the other hand, when the light shielding plate 52 is not removed though the film back 50 is attached to the camera body 11, the light shielding plate detection switch 64 and the lock hook entrance detection switch 66 are turned off while only the moving lock member position detection switch 65 is turned on, as shown in FIG. 3. When the control circuit 20 detects such a condition, the control circuit 20 carries out a release lock control to prevent the focal plane shutter 25 from running even if the release switch 26 is turned on. Further, the control circuit 20 carries out such a control that the photographer can recognize the fact that it is impossible to take a photograph because the light shielding plate 52 is not removed, before the photographer carries out a shutter release operation.

First, the main mirror 14 is rotated to the escaping position for photography by the mirror driving mechanism 23 so as to make the image of a subject for photography unobservable through the viewfinder. The image of the subject is usually observed through the viewfinder for arrangement of a photographic composition or for bringing the subject into focus before the photograph is taken. Therefore, if the viewfinder is in an unobservable state, the photographer can recognize photographic impossibility intuitively at the time when the photographer looks through the viewfinder. At the same time, the photographing impossible mark 48e is displayed by the external liquid crystal display 48 so that the photographer can recognize photographic impossibility also by viewing the external liquid crystal display 48. Incidentally, the photographing impossible mark 48e may have any desirable display form such as continuous lighting, blinking, or the like.

In addition, the control circuit 20 carries out such a control that photo-metering is not carried out even if the photo-metering switch 36 is turned on, and the F-number and the shutter speed are not displayed in the viewfinder. The photo-metering operation is carried out before the shutter release. Accordingly, if photo-metering is not carried out and no display is shown in the viewfinder, there increases a chance that the photographer can recognize photographic impossibility at least before carrying out a shutter release operation. In addition, although the film back exchangeable camera 10 in this embodiment has an auto-focus function, when the light shielding plate 52 is inserted to the slit 53, the camera 10 is controlled not to carry out an auto-focus operation in response to the turning-on of the photo-metering switch 36. That is, preparation for photography such as exposure control or an focusing operation is not carried out at all in the condition that the light shielding plate 52 is still inserted to the slit 53.

Thus, in the film back exchangeable camera in this embodiment, when the light shielding plate 52 is not removed from the film back 50 after the film back 50 has been attached to the camera body 11, not only is the shutter brought into an inoperable state through release lock means, but also the viewfinder is blocked out to make the image of the subject unobservable. In addition, neither a photographic preparation operation such as photo-metering nor information display in the viewfinder is carried out. Further, the photographing impossible mark 48e is displayed on the external liquid crystal display 48. As a result, before carrying out a shutter release operation, the photographer can be informed surely of the fact that photograph is unable to be taken because the light shielding plate 52 is still inserted.

Figure 6:
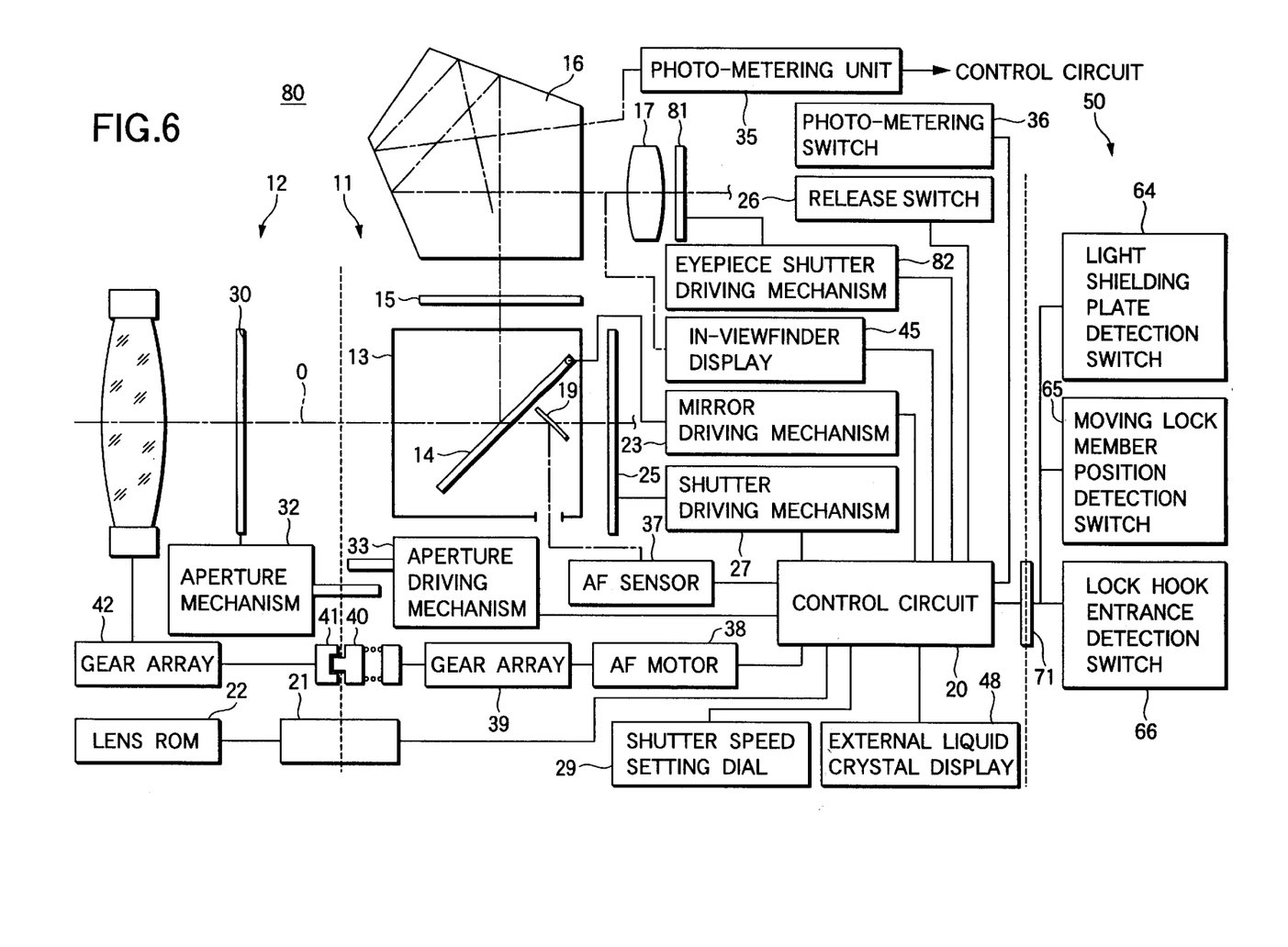
FIG. 6 is a schematic view showing an optical system and a circuitry of a film back exchangeable camera according to another embodiment of the present invention.

FIG. 6 shows another embodiment of the present invention. A film back exchangeable camera 80 in FIG. 6 is constituted by constituent parts the same as those of the film back exchangeable camera 10 in FIGS. 1 and 2 except that an eyepiece shutter 81 which can be opened/closed is provided at the rear side of the eyepiece 17. In FIG. 6, the parts the same as those in FIGS. 1 and 2 are referenced correspondingly. In the camera 80, if the eyepiece shutter 81 is closed, light is prevented from going back from the eyepiece 17 into the viewfinder 16 so that photo-metering can be prevented from being affected by such back light. The opening/closing of the eyepiece shutter 81 can be selected through a not-shown operating member by the photographer. Alternatively, under the control of the control circuit 20, the eyepiece shutter 81 may be opened/closed by an eyepiece shutter driving mechanism 82 provided with a driving source.

As described above, the control circuit 20 can detect the condition that the light shielding plate (52) is not removed though the film back 50 is attached to the camera body 11, on the basis of the turning-on/off states of the respective switches 64 to 66. When detecting a condition, the control circuit 20 carries out a release lock control to prevent the focal plane shutter 25 from driving even if the release switch 26 is turned on. At the same time, the control circuit 20 closes the eyepiece shutter 81 through the eyepiece shutter driving mechanism 82. As the eyepiece shutter 81 is closed, the photographer cannot make an observation through the viewfinder. Thus, an effect similar to that produced by moving the mirrors up in the previous embodiment can be obtained. That is, the image of a subject for photography is made unobservable through the viewfinder so that a warning is given to the photographer. Thus, before carrying out a shutter release operation, the photographer can be informed of the fact that the photographer has forgotten to remove the light shielding plate. In addition, in the same manner as that in the previous embodiment, a photographing impossible mark is displayed on the external liquid crystal display 48 so as to make the photographer recognize photographic impossibility because of the photographer's forgetting to remove the light shielding plate.

Incidentally, when the eyepiece shutter 81 is closed and a warning is given to the photographer as described in this embodiment, the image of a subject for photography becomes unobservable regardless of the position of the main mirror 14. Accordingly, the main mirror 14 does not have to be rotated to the upper position. In addition, in the condition that the eyepiece shutter 81 is closed, the data display portion 46 based on the in-viewfinder display 45 also becomes unobservable. Accordingly, the in-viewfinder display 45 may be still lit. However, in order to avoid useless power consumption, when the eyepiece shutter 81 is closed, it is desirable that photo-metering, focusing and in-viewfinder display are not carried out in the same manner as that in the previous embodiment even if the photo-metering switch 36 is turned on.

Figure 7:
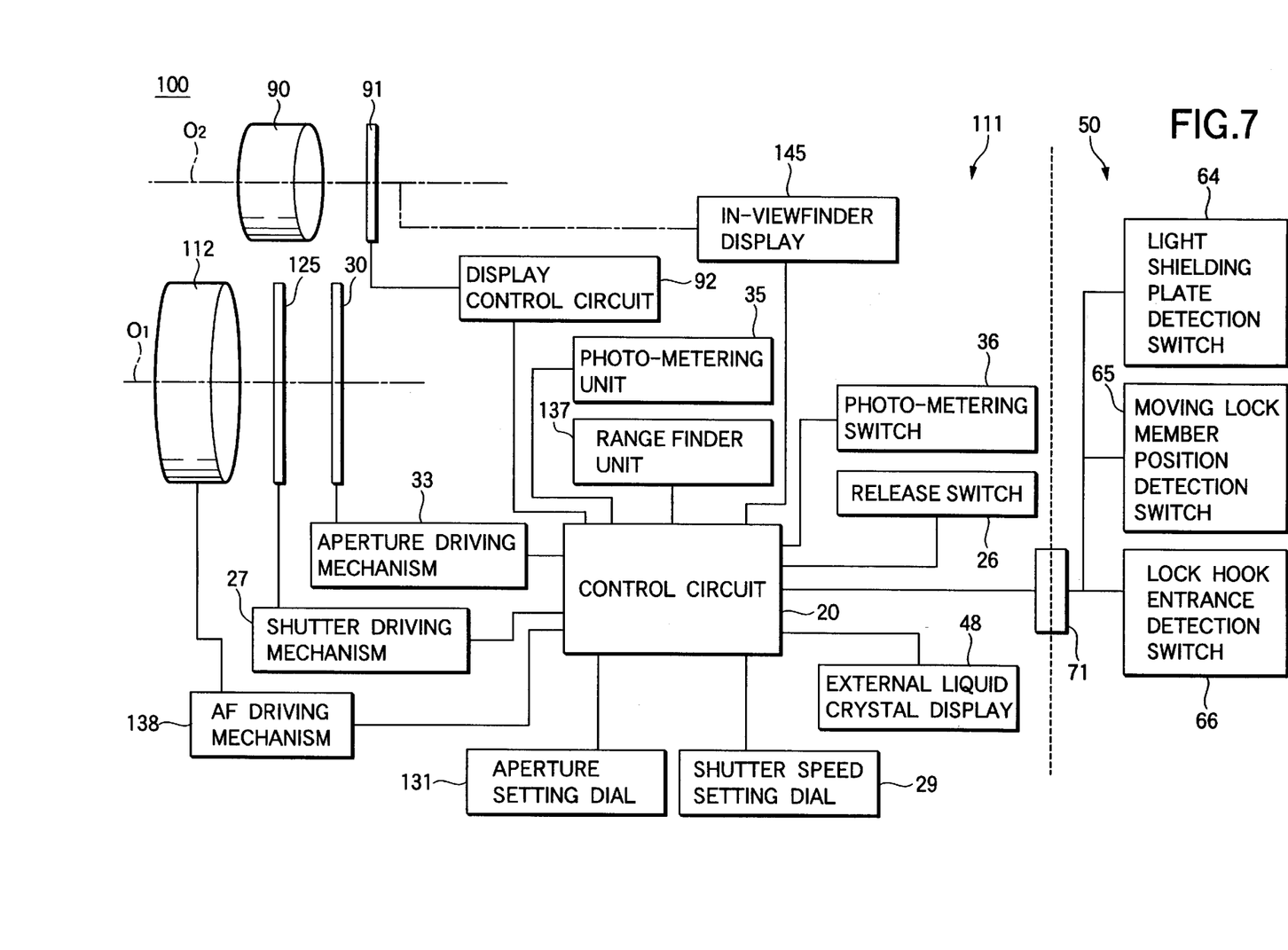
FIG. 7 is a schematic view showing an optical system and a circuitry of a film back exchangeable camera according to a further embodiment of the present invention.
Figure 8:
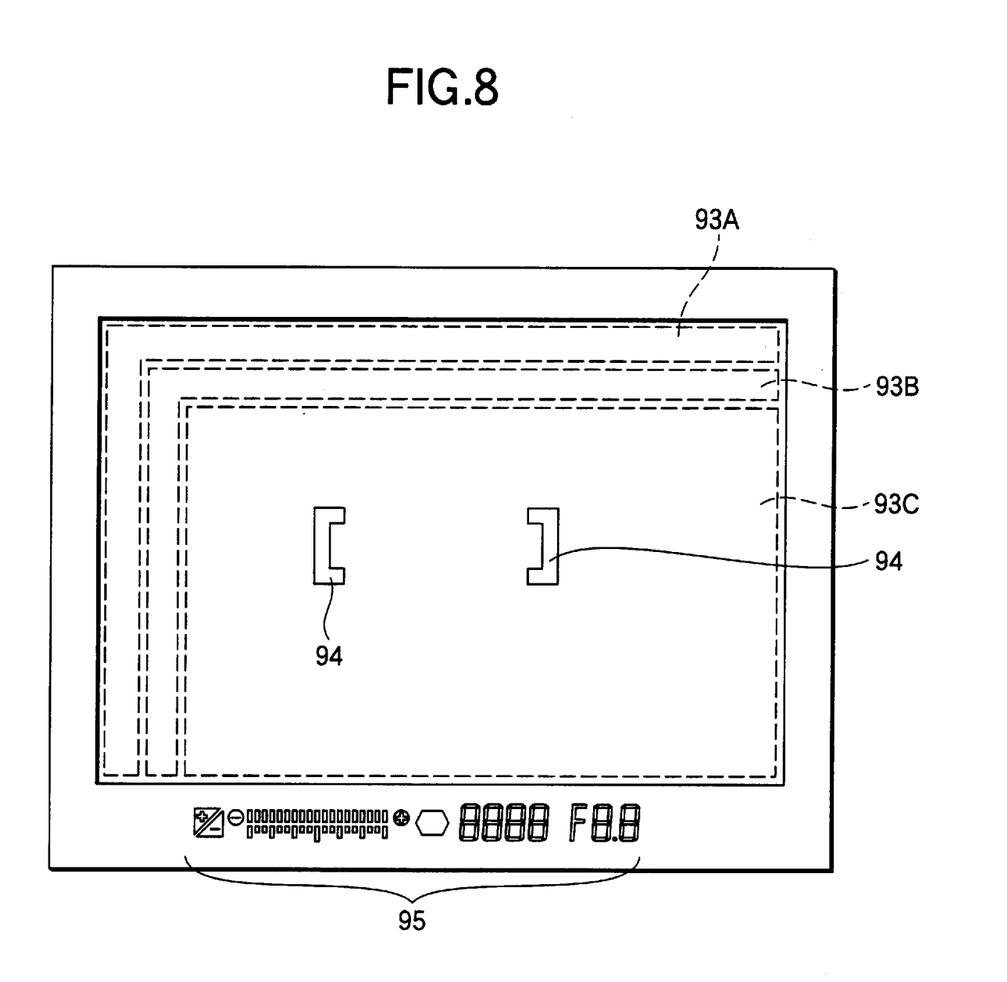
FIG. 8 is a view showing an observed state through a viewfinder of the camera in FIG. 7.

FIGS. 7 and 8 show a further another embodiment of the present invention. Constituent parts the same as those in the previous embodiments are referenced correspondingly. A film back exchangeable camera 100 shown in FIGS. 7 and 8 is a lens shutter camera which has a viewfinder optical system 90 independent of a camera lens 112 and in which shutter blades 125 are disposed in the camera lens 112. The camera lens 112 is fixed to a camera body 111 so that a photographic optical axis $O_1$ is substantially parallel with a viewfinder optical axis $O_2$ of the viewfinder optical system 90.

Also in the camera 100 in this embodiment, in the same manner as that in the previous embodiments, the shutter speed setting dial 29 and an aperture setting dial 131 provided in the camera body 111 are operated so that exposure can be controlled in four modes: a mode to set both the F-number and the shutter speed automatically; modes to set one of the F-number and the shutter speed automatically while setting the other manually; and a mode to set both of them manually. Since the details of the exposure control modes were described previously, their description will be omitted to avoid repetition. When the photo-metering switch 36 is turned on, photo-metering is carried out with the photo-metering unit 35. When the release switch 26 is turned on, the aperture blades 30 are adjusted to a set F-number while the shutter blades 125 are opened for a set time so as to make the light pass through the shutter blades 125. Thus, a film in the film back 50 is exposed.

The camera lens 112 has a group of focus lenses which can move along the photographic optical axis $O_1$. When the photo-metering switch 36 is turned on, a distance to a subject for photography is measured by a range finder unit 137, and the group of focus lenses are moved by an AF driving mechanism 138 so as to bring the subject into focus.

A transmission-type liquid crystal display 91 is disposed on the optical path of the viewfinder optical system 90. A polymeric liquid crystal is enclosed by the transmission-type liquid crystal display 91. The polymeric liquid crystal is in a transparent state normally but gets cloudy, in response to an electric current applied thereto, into a light scattering state where the polymeric liquid crystal scatters light incident thereon. As shown in FIG. 8, by controlling the current applied to the polymeric liquid crystal, a first correction frame 93A and a second correction frame 93B for parallax correction for close-up photography can be displayed in the view field of the viewfinder. Light from the subject for photography is blocked in the displayed portions of the correction frames 93A and 93B in the light scattering state so that the subject becomes unobservable in the portions. The transmission-type liquid crystal display 91 can also change a center view field area 93C other than the correction frames 93A and 93B into the light scattering state. That is, if the transmission-type liquid crystal display 91 is controlled to bring all the first and second correction frames 93A and 93B and the center view field area 93C into the light scattering state, the image of the subject can be made unobservable through the viewfinder. On the contrary, if the frames 93A and 93B and the area 93C are released from the light scattering state, the viewfinder can be switched to an observable state.

A focus frame 94 and a data display portion 95 can be observed in the viewfinder. The data display portion 95 displays information similar to that in the data display portion 46 in FIG. 4. The focus frame 94 and the data display portion 95 are displayed by an in-viewfinder display 145 provided separately from the transmission-type liquid crystal display 91.

In the film back exchangeable camera 100 described above, when the control circuit 20 detects, from the turning on/off states of the respective switches 64 to 66, the condition that the light shielding plate is not detached though the film back 50 is attached to the camera body 111, the control circuit 20 carries out a release lock control to prevent the shutter blades 125 from operating even if the release switch 26 is turned on. At the same time, the control circuit 20 controls the electric current applied to the transmission-type liquid crystal display 91 so that the states of all the first and second correction frames 93A and 93B and the center view field area 93C are changed into the light scattering state. Thus, substantially all the area of the viewfinder view field is brought into the light scattering state so that the image of the subject cannot be observed substantially. As a result, at the time when the photographer looks through the viewfinder, the photographer can recognize photographic impossibility because of the light shielding plate still attached. At the same time, a photographing impossible mark is displayed on the external liquid crystal display 48 so as to make the photographer recognize the photographic impossibility also through the external display.

In addition, in the same manner as that in the previous embodiments, when the attachment of the light shielding plate is detected, photo-metering and focusing are not carried out even if the photo-metering switch 36 is turned on. The in-viewfinder display 145 is controlled not to display the focus frame 94 and the data display portion 95.

In this embodiment, as described above, the transmission-type liquid crystal display 91 in the viewfinder optical system is used as viewfinder lock means for switching the viewfinder between the observable state and the unobservable state. Accordingly, also by the configuration other than the mirror or the eyepiece shutter, the image of the subject for photography is made unobservable so that the photographer can recognize the fact that the photographer has forgotten to remove the light shielding plate. Incidentally, in this embodiment, the center view field area 93C other than the correction frames 93A and 93B is large. Therefore, only the center view field area 93C may be controlled to be cloudy when it is detected that the photographer has forgotten to remove the light shielding plate.

As is apparent from the respective embodiments described above, when forgetting to remove the light shielding plate after attachment of the film back to the camera body, the photographer is informed of a problem by making the image of the subject unobservable in the viewfinder, or by prohibiting a photographic preparation operation in response to the turning-on of the photo-metering switch, or by carrying out an indication of a photographing impossible state on the external liquid crystal display, before the photographer carries out a shutter release operation,. Thus, the photographer can recognize photographic impossibility more quickly and more surely than the case using a conventional film back exchangeable camera which copes with such photographic impossibility only by release lock means. As a result, the possibility of a photographic mistake can be reduced.

Incidentally, the present invention is not limited to the illustrated embodiments. According to the embodiments, when the light shielding plate is not detached after the film back has been attached to the camera body, the viewfinder is made unobservable, the photographing impossible mark is displayed on the external liquid crystal display, and various operations carried out in response to the turning-on of the photo-metering switch are prohibited. However, any one or two of such measures may be performed. Moreover, although the liquid crystal display is used as the external display means for displaying the indication of the photographing impossible state in the embodiments, any other type of display means may be used. For example, an LED may be used as the external display means so that the indication of the photographing impossible state is carried out by blinking the LED.

As is apparent from the above description, according to the film back exchangeable camera of the present invention, the photographer can recognize, quickly and surely, that the photographer has forgotten to remove the light shielding member. Thus, the possibility of a photographic mistake can be reduced.

What is claimed is:
1. A film back exchangeable camera comprising:
  a camera body;
  an exchangeable film back removably attached to said camera body;
  a light shielding member removably attached to said film back so that a film in said film back is prevented from being exposed when said light shielding member is attached to said film back, and said film is permitted to be exposed when said light shielding member is removed from said film back;
  a film back attachment detecting system which detects attachment of said film back to said camera body;
  a light shielding member attachment detecting system which detects attachment of said light shielding member to said film back;
  a release lock system which switches a shutter between an operable state and an inoperable state; and
  a viewfinder lock system which switches a viewfinder between an observable state and an unobservable state;
  wherein said shutter is brought into said inoperable state by said release lock system and said viewfinder is brought into said unobservable state by said viewfinder lock system when attachment of said film back to said camera body is detected by said film back attachment detecting system and attachment of said light shielding member to said film back is detected by said light shielding member attachment detecting system.

2. A film back exchangeable camera according to claim 1,
  wherein said viewfinder lock system has a mirror in said camera body, said mirror being able to move between an observation position where said mirror is located on a photographic optical path so as to guide luminous flux passing through a camera lens to an optical system of said viewfinder, and a photographing position where said mirror escapes from said photographic optical path so as to allow said luminous flux to reach said film back, and
  wherein said mirror is moved to the photographing position when said film back is attached to said camera body and said light shielding member is attached to said film back.

3. A film back exchangeable camera according to claim 1, wherein said viewfinder lock system has a movable eyepiece shutter which is able to be opened/closed in an optical system of said viewfinder, said eyepiece shutter being closed when said film back is attached to said camera body and said light shielding member is attached to said film back.

4. A film back exchangeable camera according to claim 1,
  wherein said viewfinder lock system has a light-transmission adjusting medium in an optical system of said viewfinder, said light-transmission adjusting medium being able to change between a transparent state and a light scattering state to scatter incident light, and
  wherein at least a part of a view-field area of said viewfinder is brought into said light scattering state by said light-transmission adjusting medium when said film back is attached to said camera body and said light shielding member is attached to said film back.

5. A film back exchangeable camera according to claim 4, wherein said light-transmission adjusting medium is a light-transmissible liquid crystal.

6. A film back exchangeable camera according to claim 1, further comprising a photo-metering system which carries out photo-metering in response to turning-on of a photo-metering switch;

wherein said photo-metering system is prevented from carrying out photo-metering even if said photo-metering switch is turned on when said film back is attached to said camera body and said light shielding member is attached to said film back.

7. A film back exchangeable camera according to claim 6, further comprising an automatic focusing system which carries out a focusing operation in response to turning-on of said photo-metering switch;

wherein said automatic focusing system is prevented from carrying out said focusing operation even if said photo-metering switch is turned on when said film back is attached to said camera body and said light shielding member is attached to said film back.

8. A film back exchangeable camera according to claim 6, further comprising an in-viewfinder display which is lit in response to turning-on of said photo-metering switch;

wherein said in-viewfinder display is prevented from being lit even if said photo-metering switch is turned on when said film back is attached to said camera body and said light shielding member is attached to said film back.

9. A film back exchangeable camera according to claim 1, further comprising an external display system disposed in an outer surface of said camera body;

wherein an indication of an photographing impossible state is displayed by said external display system when said film back is attached to said camera body and said light shielding member is attached to said film back.

10. A film back exchangeable camera comprising:

a camera body;

an exchangeable film back removably attached to said camera body;

a light shielding member removably attached to said film back so that a film in said film back is prevented from being exposed when said light shielding member is attached to said film back, and said film is permitted to be exposed when said light shielding member is removed from said film back;

a film back attachment detecting system which detects attachment of said film back to said camera body;

a light shielding member attachment detecting system which detects attachment of said light shielding member to said film back;

a release lock system which switches a shutter between an operable state and an inoperable state; and a photo-metering system which carries out photo-metering in response to turning-on of a photo-metering switch;

wherein said shutter is brought into said inoperable state by said release lock system and said photo-metering system is prevented from carrying out photo-metering even if said photo-metering switch is turned on, when attachment of said film back to said camera body is detected by said film back attachment detecting system and attachment of said light shielding member to said film back is detected by said light shielding member attachment detecting system.

11. A film back exchangeable camera according to claim 10, further comprising an automatic focusing system which carries out a focusing operation in response to turning-on of said photo-metering switch;

wherein said automatic focusing system is prevented from carrying out said focusing operation even if said photo-metering switch is turned on when said film back is attached to said camera body and said light shielding member is attached to said film back.

12. A film back exchangeable camera according to claim 10, further comprising an in-viewfinder display which is lit in response to turning-on of said photo-metering switch;

wherein said in-viewfinder display is prevented from being lit even if said photo-metering switch is turned on when said film back is attached to said camera body and said light shielding member is attached to said film back.

13. A film back exchangeable camera according to claim 10, further comprising a viewfinder lock system which switches a viewfinder between an observable state and an unobservable state;

wherein said viewfinder is brought into said unobservable state by said viewfinder lock system when said film back is attached to said camera body and said light shielding member is attached to said film back.

14. A film back exchangeable camera according to claim 13, wherein said viewfinder lock system has a mirror in said camera body, said mirror being able to move between an observation position where said mirror is located on a photographic optical path so as to guide luminous flux passing through a camera lens to an optical system of said viewfinder, and a photographing position where said mirror escapes from said photographic optical path so as to allow said luminous flux to reach said film back, and wherein said mirror is moved to the photographing position when said film back is attached to said camera body and said light shielding member is attached to said film back.

15. A film back exchangeable camera according to claim 13, wherein said viewfinder lock system has a movable eyepiece shutter which is able to be opened/closed in an optical system of said viewfinder, said eyepiece shutter being closed when said film back is attached to said camera body and said light shielding member is attached to said film back.

16. A film back exchangeable camera according to claim 13, wherein said viewfinder lock means has a light-transmission adjusting medium in an optical system of said viewfinder, said light-transmission adjusting medium being able to change between a transparent state and a light scattering state to scatter incident light, and wherein at least a part of a view-field area of said viewfinder is brought into said light scattering state by said light-transmission adjusting medium when said film back is attached to said camera body and said light shielding member is attached to said film back.

17. A film back exchangeable camera according to claim 16, wherein said light-transmission adjusting medium is a light-transmissible liquid crystal.

18. A film back exchangeable camera according to claim 10, further comprising an external display system disposed in an outer surface of said camera body;

wherein an indication of a photographing impossible state is displayed by said external display means when said film back is attached to said camera body and said light shielding member is attached to said film back.

19. A film back exchangeable camera comprising:

a camera body;

an exchangeable film back removably attached to said camera body;

a light shielding member removably attached to said film back so that a film in said film back is prevented from being exposed when said light shielding member is attached to said film back, and said film is permitted to be exposed when said light shielding member is removed from said film back;

a film back attachment detecting system which detects attachment of said film back to said camera body;

a light shielding member attachment detecting system which detects attachment of said light shielding member to said film back;

a release lock system which switches a shutter between an operable state and an inoperable state; and an external display system provided in an outer surface of said camera body;

wherein said shutter is brought into said inoperable state by said release lock system and an indication of a photographing impossible state is displayed by said external display system, when attachment of said film back to said camera body is detected by said film back attachment detecting system and attachment of said light shielding member to said film back is detected by said light shielding member attachment detecting system.

20. A film back exchangeable camera according to claim 19, further comprising a viewfinder lock system which switches a viewfinder between an observable state and an unobservable state;

wherein said viewfinder is brought into said unobservable state by said viewfinder lock system when said film back is attached to said camera body and said light shielding member is attached to said film back.

21. A film back exchangeable camera according to claim 20, wherein said viewfinder lock system has a mirror in said camera body, said mirror being able to move between an observation position where said mirror is located on a photographic optical path so as to guide luminous flux passing through a camera lens to an optical system of said viewfinder, and a photographing position where said mirror escapes from said photographic optical path so as to allow said luminous flux to reach said film back, and wherein said mirror is moved to the photographing position when said film back is attached to said camera body and said light shielding member is attached to said film back.

22. A film back exchangeable camera according to claim 20, wherein said viewfinder lock system has a movable eyepiece shutter which is able to be opened/closed in an optical system of said viewfinder, said eyepiece shutter being closed when said film back is attached to said camera body and said light shielding member is attached to said film back.

23. A film back exchangeable camera according to claim 20, wherein said viewfinder lock means has a light-transmission adjusting medium in an optical system of said viewfinder, said light-transmission adjusting medium being able to change between a transparent state and a light scattering state to scatter incident light, and wherein at least a part of a view-field area of said viewfinder is brought into said light scattering state by said light-transmission adjusting medium when said film back is attached to said camera body and said light shielding member is attached to said film back.

24. A film back exchangeable camera according to claim 23, wherein said light-transmission adjusting medium is a light-transmissible liquid crystal.

25. A film back exchangeable camera according to claim 19, further comprising a photo-metering system which carries out photo-metering in response to turning-on of a photo-metering switch;

wherein said photo-metering system is prevented from carrying out photo-metering even if said photo-metering switch is turned on when said film back is attached to said camera body and said light shielding member is attached to said film back.

26. A film back exchangeable camera according to claim 25, further comprising an automatic focusing system which carries out a focusing operation in response to turning-on of said photo-metering switch;

wherein said automatic focusing system is prevented from carrying out said focusing operation even if said photo-metering switch is turned on when said film back is attached to said camera body and said light shielding member is attached to said film back.

27. A film back exchangeable camera according to claim 25, further comprising an in-viewfinder display which is lit in response to turning-on of said photo-metering switch;

wherein said in-viewfinder display is prevented from being lit even if said photo-metering switch is turned on when said film back is attached to said camera body and said light shielding member is attached to said film back.

* * * * *